United States Patent [19]
Makineni et al.

[11] Patent Number: 5,880,985
[45] Date of Patent: Mar. 9, 1999

[54] EFFICIENT COMBINED ARRAY FOR 2N BIT N BIT MULTIPLICATIONS

[75] Inventors: Sivakumar Makineni, Sunnyvale; David Harris, Stanford; Thomas Grutkowski, Mountain View; Michael James Morrison, Santa Clara, all of Calif.

[73] Assignee: Intel Corporation, Santa Clara, Calif.

[21] Appl. No.: 735,058

[22] Filed: Oct. 18, 1996

[51] Int. Cl.$^6$ .................................................. G06F 7/52
[52] U.S. Cl. ..................... 364/757; 364/760.01
[58] Field of Search ............... 364/736.02, 748.09, 364/748.17, 769, 750.5, 754.01, 754.02, 754.03, 754.57, 758, 759, 760.01, 760.02, 760.03, 760.04, 760.5, 757

[56] References Cited

U.S. PATENT DOCUMENTS

| | | | |
|---|---|---|---|
| 4,817,029 | 3/1989 | Finegold | 364/760.03 |
| 4,825,401 | 4/1989 | Ikumi | 364/757 X |
| 5,446,651 | 8/1995 | Moyse et al. | 364/760.03 |
| 5,521,856 | 5/1996 | Shiraishi | 364/760.01 |

*Primary Examiner*—Chuong Dinh Ngo
*Attorney, Agent, or Firm*—Kenyon & Kenyon

[57] ABSTRACT

In order to multiply operands of different binary lengths using a common combined array, for example to do both 8 bit by 8 bit and 16 bit by 16 bit multiplications, $2^{m-1}$ multiplications are performed, where m is equal to the number of different bit lengths it is desired to multiply. For example, where 8×8 bit and 16×16 bit multiplications are done, 2 different multiplications are done. Each multiplication is an $n \times n/2^{m-1}$ multiplication, e.g., a 16×8 bit multiplication. Sign correction is performed by adding a correction vector or by modifying one of the partial products. The results of the multiplications are added together to obtain a 2 n bit result. Groups of bits from said 2 n result are selected depending on the length of the operands being multiplied.

16 Claims, 10 Drawing Sheets

FIG. 8

FIG. 9

EFFICIENT COMBINED ARRAY FOR 2N BIT N BIT MULTIPLICATIONS

BACKGROUND OF THE INVENTION

This invention relates to computer multiplication in general and more particularly to an efficient combined multiplier array which can carry out multiplications on different length operands.

Various types of multipliers for use in computers have been developed. One of these types, known as a combinational array multiplier, utilizes an array including a plurality of carry save adders feeding a carry propagate adder from which the result is obtained. Such combined arrays in many instances have relied upon Booth's algorithm. See for example, *Computer Architecture and Organization,* 2nd Ed. by John P. Hayes, McGraw Hill, 1988, particularly pages 241–250. A detailed implementation of Booth's algorithm is described in U.K. Patent Application GB 2,262,638A, published Jun. 23, 1993, particularly in FIGS. 9–12.

The general arrangement of a specific combinational multiplier that can perform four 16×16 multiplications is illustrated in FIG. 1. The arrangement shown includes a first register 10 containing a first operand X comprising 64 bits and a second register 20 containing operand Y comprising 64 bits. One skilled in the art will appreciate that registers 10 and 20 can be any of a variety of other storage devices such as accumulators. Four groups of 16 of the 64 bits in register 10 provide the A, C, E, and G inputs for four 16×16 multipliers 15 a–d. Similarly, 16 bit groups of the register 20 (i.e., B, D, F, and H) are provided as inputs to four Booth encoders 19, and the outputs of the Booth encoders 19 are coupled as inputs to multipliers 15 a–d. Each of the multipliers generates a 32-bit output. These 32-bit outputs are used to generate the result of the multiplication of operands X and Y. As is known in the art, output shift and multiplexers (not shown specifically in FIG. 1) can be used to select the appropriate multiplier outputs for the result.

The same techniques can, of course, be utilized for multiplying larger or smaller numbers of bits. In current computers, at least 16 bit multiplications are required. In some instances, however, being able to multiply smaller numbers of bits has advantages. For example, the ability to do two 8 bit multiplications instead of a single 16 bit multiply can give significant performance advantages for low end graphics and video game applications. It can also provide a speed up for certain signal processing routines. Although it would be possible to implement 8 bit multiplies with separate 8 bit multiplier arrays, these arrays are an expensive resource. Thus, there is a need to provide an efficient combined array which can carry out both 2 n bit and n bit multiplications, e.g., where n=8. Stated another way, there is a need to have, in a processor which includes a multiplier array which can multiply a pair of 2 n bit numbers, the capability, using the same array, to also multiply two pairs of n bit numbers simultaneously.

SUMMARY OF THE INVENTION

The present invention accomplishes such an efficient combined array multiplier. In general, in order to do multiplications with operands of m different lengths using a common combined array, where the largest pairs of operands to be multiplied have n bits, $2^{m-1}$ multipliers are used each multiplier being an $n \times (n/2^{m-1})$ multiplier. For example, if n=16 and m=3, four multipliers each multiplying 16 bits×4 bits would be used. The results of the multiplications are added together to obtain a 2 n bit product. Within this result will be one n×n product or two n/2×n/2 products or four n/4×n/4 products. These products can then be selected using multiplexers. In the case of signed operands, when adding the different multiplication results, a correction vector must be added. The number of bits in the correction vector will equal the number of multiplications minus one. Thus, in the example above for two 8 bit multiplications, a one bit correction vector is needed. For four 4 bit multiplications, a 3 bit correction vector is needed and so on.

In the specifically disclosed embodiment, such a combined array is obtained by substituting for at least one of the prior 16×16 bit multipliers, i.e., one of multipliers 15a–15d of FIG. 1, with two 16×8 bit multipliers. The multipliers compute A'•B0 and A"•B1 where A' and A" are 16 bit numbers derived from A and B0 and B1 are 8 bit numbers, derived from the lower and upper halves of B, respectively. The 24 bit results can then be added to form the 32 bit product for a 16×16 multiply. Alternately, two 16 bit products can be extracted for two 8×8 multiplies. Considering the multiplier 15a of FIG. 1, the 16 bits of the A operand for the multiplier are converted to a 16 bit derivative operand designated A'. A' includes as its bits 0 to 7, the bits 0 to 7 of the quantity A. For the bits 8 to 15 of A', a selection is made depending on the type of multiplication being carried out. For a 16×16 bit multiplication bits 8 through 15 of the A input become bits 8 through 15 of A'. For a signed 8×8 bit multiplication, bit 7 of the A input signal, which is the sign of the 8 bit quantity in the lower 8 bits of the A operand being multiplied, is sign extended as the input for bits 8 to 15. For an unsigned 8×8 multiplication, bits 8 to 15 are set to 0. Thus, for 8×8 multiplications of the lower 8 bits of the A operand, the upper 8 bits of the A operand are either sign extended or all zeros.

A" is formed in a similar manner. A" has as its upper 8 bits (bits 8 to 15) the upper eight bits of the A operand. Its lower 8 bits are selected to be either the lower 8 bits of the A operand for 16 bit multiplies, or all zeros for 8 bit multiplies.

The B operand is divided into B0 and B1. B0 which comprises the lower eight bits 0 to 7 has its bit 8 and bit 9 sign extended by 2 bits for signed 8 bit multiplications and 0 extended for unsigned 8 bit multiplications. A trailing zero is also added. B0 is then Booth encoded to generate 5 partial products for A'•B0. The partial products are then added using a 5:2 carry save adder (CSA). For 16 bit multiplication, the entire 24 bit result is meaningful. For an 8 bit multiplication the upper 8 bits will have zeros or sign extension bits.

In a similar fashion, multiplication of operands A"×B1 is performed simultaneously. The upper 8 bits of the B operand, designated B1, are sign extended or zero extended by two bits depending on whether it is a signed/unsigned multiplication. A least significant bit is added which is zero for an 8 bit multiplication, and the value of bit 7 of B for a 16 bit multiplication prior to Booth encoding and partial product generation. Again, 5:2 carry save adders are used to add the partial products and a 24 bit result is generated.

The weighted summation of the two products A'×B0 and A"×B1 gives the 32 bit product for 16×16 multiplies. The summation is carried out using carry save adders and a carry propagate adder having as inputs the outputs from the multiplications of A'×B0 and A"×B1. For 8 bit multiplications a signed correction vector is provided and also summed with the weighted sum of the two 24 bit products. The output of the final CSA tree (that adds A'×B0 and A"×B1 and the correction vector) provides sum and carry vectors which are added using the CPA (carry propagate adder) to obtain a 32 bit result. For 16 bit multiplies, this is the 32 bit product. For 8×8 bit multiplies two 16 bit products are contained in these 32 bits. A multiplexer is then used to deliver the results depending on the type of multiplication.

In addition, implementations in which the correction vector is eliminated through modified partial product generation and in which sign bit loading is reduced through a modification of the Booth encoding are also disclosed.

As indicated above, although the present invention is disclosed in connection with breaking a 16×16 bit multiplication into two 16×8 multiplications so as to be able to do both 16 bit×16 bit and two 8 bit×8 bit multiplications with the same array, the method and arrangement of the present application is in general applicable to any size multiplication, and the breakup can be carried out to a higher degree.

BRIEF DESCRIPTION OF THE DRAWINGS

FIG. 8 is a diagram showing Booth encoder implementation which avoids loading the sign bit.

FIG. 9 is a diagram illustrating an optimization of the Booth encoding which permits reducing the critical path and reduces the number of CSAs required.

DETAILED DESCRIPTION

Figure 1:
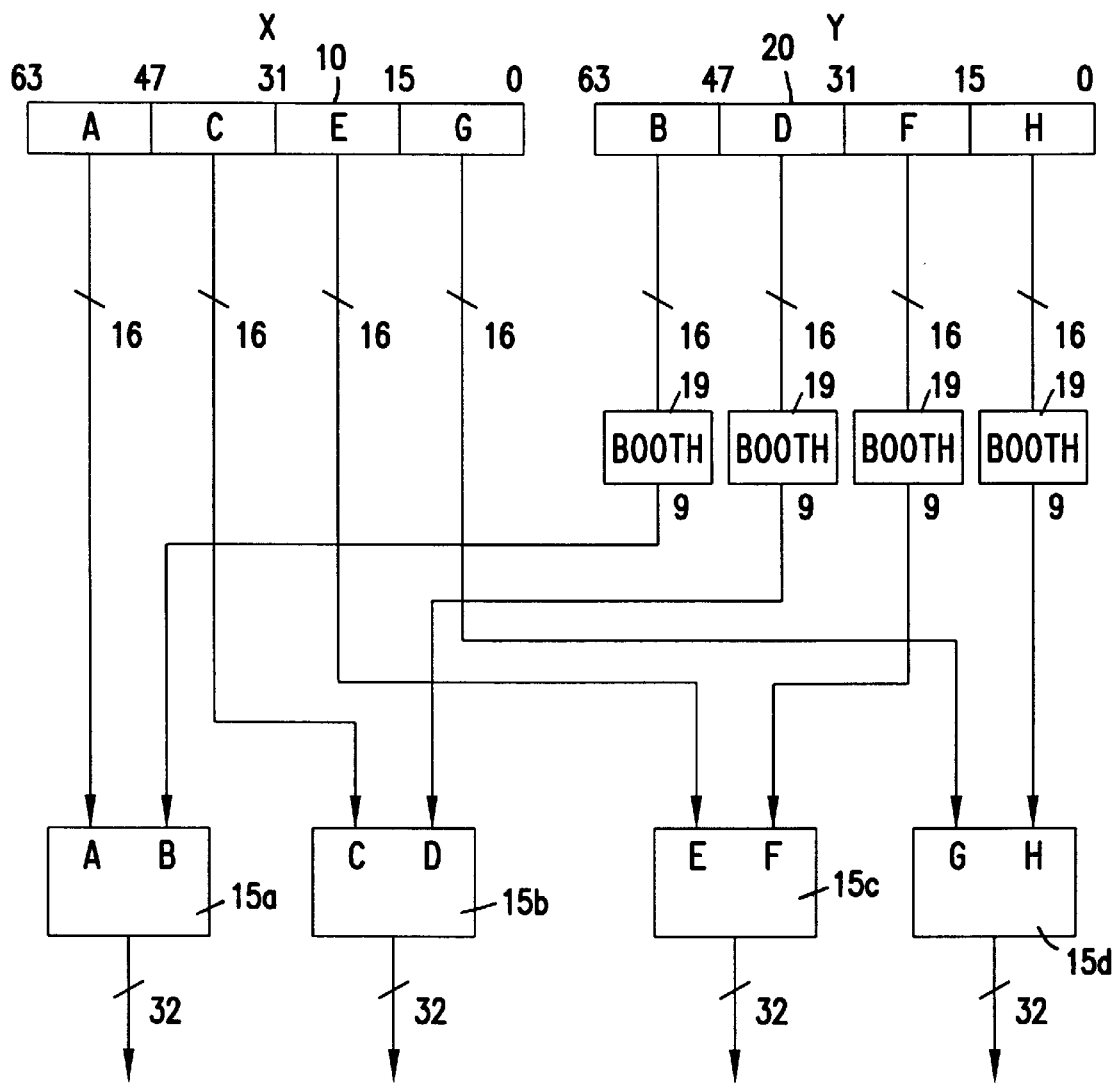
FIG. 1 is a block diagram of a prior art array multiplier which includes four 16 bit×16 bit multipliers.
Figure 2:
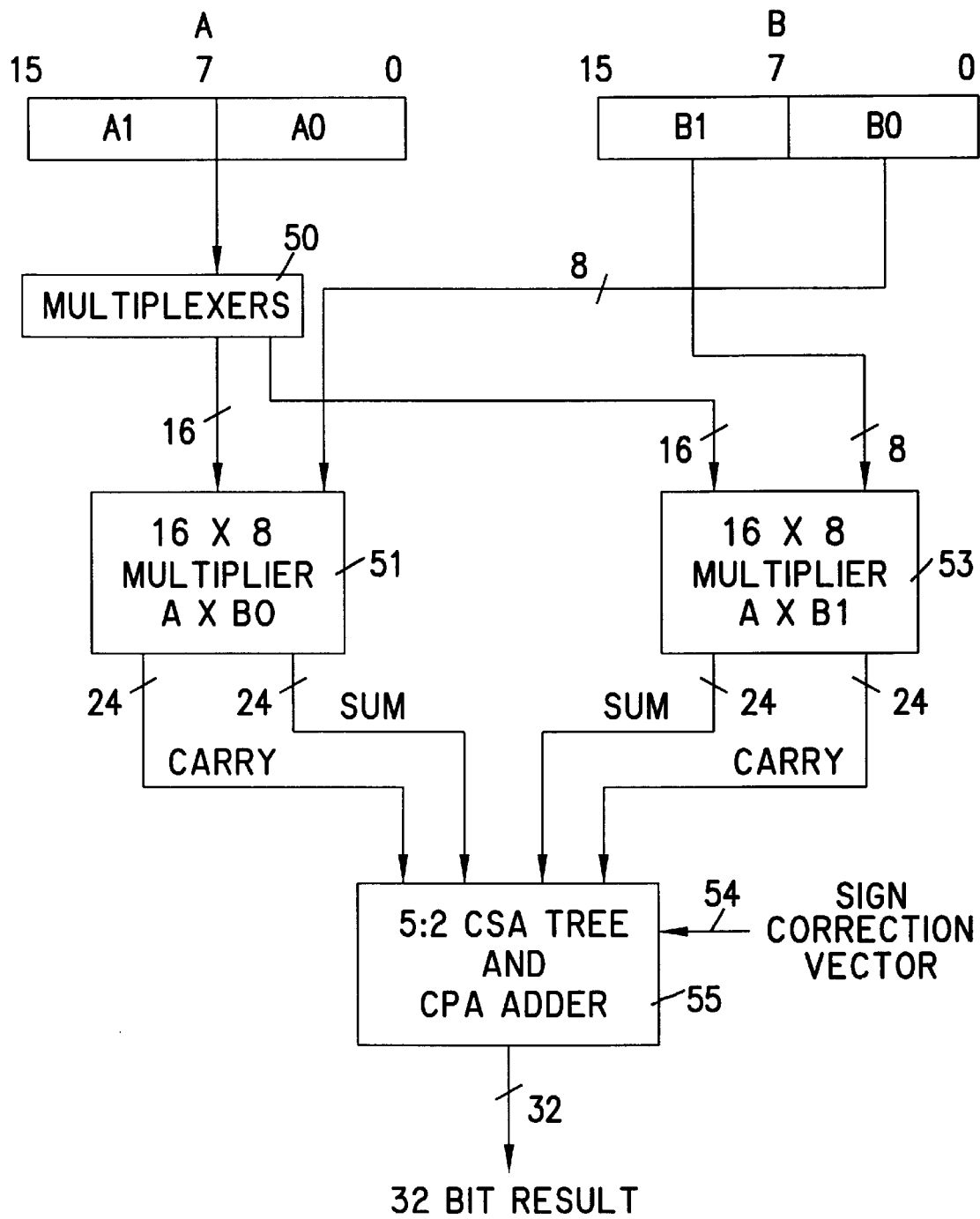
FIG. 2 is an overall block diagram of the arrangement of the present invention showing one of the 16×16 bit multipliers of FIG. 1 replaced by, two 16×8 bit multipliers.

FIG. 2 is a functional block diagram of the arrangement of the present invention. What in the prior art was previously a 16×16 bit multiplier 15a is changed to two 16×8 bit multipliers. Specifically in this case the operands A and B formerly multiplied in 16 bit×16 bit multiplier 15a of FIG. 1 are multiplied using two 16 bit×8 bit multipliers 51 and 53. The two operands to be multiplied, A and B are, as before, 16 bit quantities. Each of A and B can be either a single 16 bit number or two eight bit numbers. In each multiplier 51 and 53 the 16 bit operand A (actually a derivative thereof as will be seen below) is multiplied by 8 bits of the operand B. The operand B is divided into two parts, B0 and B1. The resulting products are A×B0 and A×B1. As will be seen below, in multipliers 51 and 53 the B operands are Booth encoded and partial products are generated, which are then combined in carry save adders, to produce in 24 bits of sum and 24 bits of carry from each of the two multipliers 51 and 53. These results are then combined, along with a sign correction vector on line 54, in block 55, which includes a 5:2 carry save adder tree and a carry propagate adder, to obtain a 32 bit result from a skewed addition of the two 24 bit numbers. In the case of a 16 bit×16 bit multiplication, the whole 32 bits are the result of the multiplication and either the high 16 bits or the low 16 bits may be selected. In the case of two 8 bit by 8 bit multiplications, each of the results is 16 bits and appropriate selections of the high and low bits are made as described below.

For 16 bit×16 bit multiplications, the derivative of the operand A is equal to A. For 8 bit multiplications, the operand A must be modified to generate derivatives A' and A". The multiplications of blocks 51 and 53 are shown in more detail in FIGS. 4 and 5 and the details of the operation of block 55 of FIG. 2 is detailed in FIG. 6.

Figure 3:
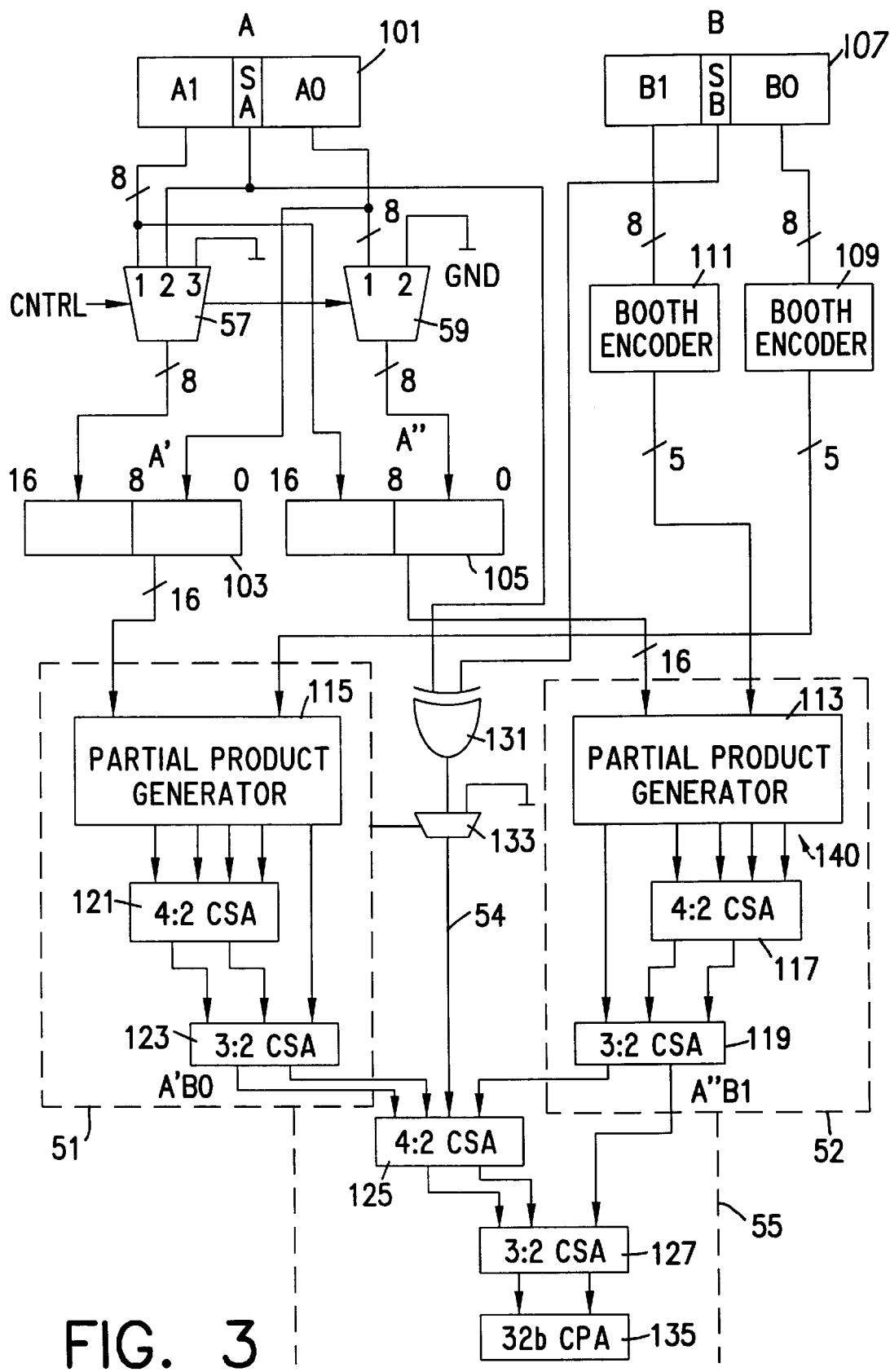
FIG. 3 is a block diagram showing the structure of the multiplier according to the present invention.

FIG. 3 is an overall block diagram of the array of the present invention. As illustrated, the operand A, which can be stored in a register 101, is divided into parts A1 and A0. For signed 8 bit multiplications, bit 7 of A0 is the sign bit of the lower 8 bits when A contains two eight bit numbers. The portion A1 is one input to 3:1 multiplexer 57 which has as its second input, the sign bit from register 101, and ground as its third input. A1 is also directly connected as the input to the upper 8 bits of register 105 containing the derivative operand A". Similarly, A0 is directly connected as the input to the lower 8 bits in register 103 containing the derivative operand A". A0 is also one input to the multiplexer 59, the other input of which is grounded. In the case of 16 bit numbers, both A' and A" will be the same as A. For unsigned 8 bit numbers, the operand A0 will be in the lower 8 bits of A', and its upper 8 bits will be zero. Similarly, the upper 8 bits of A" will be equal to operand A1, and its lower 8 bits will be zero. In the case of a signed 8 bit number, the upper 8 bits of A' will be sign extended.

The B operand in register 107 is also divided into two eight bit operands, B1 and B0. These operands are provided to Radix 4 Booth encoders 109 and 111. Booth encoder 111, in conventional fashion, provides its five outputs to partial product generator 113 in which the necessary five partial products are generated from the operand A" and the encoded B1 operand. The results of encoding operand B0 in Booth encoder 109 are provided to partial product generator 115. The five partial product outputs of partial product generator 113 are combined using a 4:2 CSA 117, and a 3:2 CSA 119. The result out of 3:2 CSA 119 is the product A"B1. Similarly, the outputs of partial product generator 115 are combined in 4:2 CSA 121, and 3:2 CSA 123, to result in the product A'B0. The results A'B0 and A"B1 are combined using 4:2 CSA 125, and 3:2 CSA 127. Also added at this time is a correction vector on line 54. The correction vector is obtained by XORing the sign bits of the A0 operand and the B0 operand in exclusive OR gate 131. The output of gate 131 is an input to a multiplexer 133. Multiplexer 133 is controlled such that if two signed 8 bit numbers A0 and B0 are being multiplied, the single bit output of XOR gate 131 is provided as the correction vector at bit position [16]. In other cases, zero is provided as the correction input. The result of the addition of these quantities from CSA 127 is provided to a 32 bit CPA 135.

Figure 4:
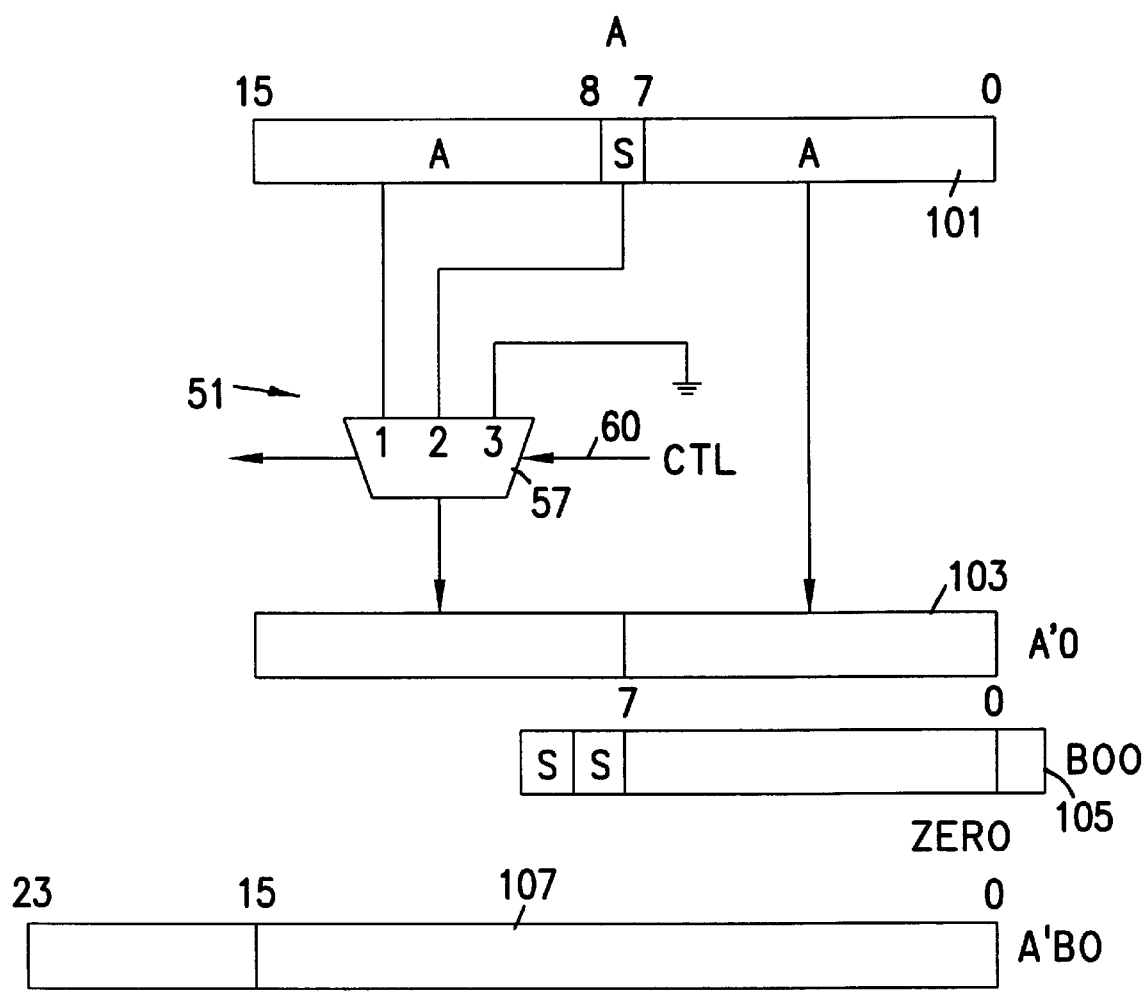
FIG. 4 shows the inputs and outputs to one of the multipliers of FIG. 2.

FIG. 4 shows the multiplication of A×B0 carried out in the first multiplier 51. A register 101 contains operand A. Operand A may be a 16 bit number. If signed, bit 15 will be the sign bit. It may also contain a first 8 bit number in bits 0–7 and a second eight bit number in bits 8–15. These are designated A0 and A1. If signed, bits 7 and 15 are the respective sign bits. Operand A is first converted into a derivative operand A' which can be stored in a register 103. The lower 8 bits of A' are the same as the lower 8 bits of A. The upper 8 bits of A' are either zeros or a sign extension of A[7] or the same as the upper 8 bits of A, depending on the multiplication being performed. A 3-1 multiplexer 57 selects one of these possibilities based on CTL input 60. For a 16 bit multiplication, A' is the same as A and input 1 of multiplexer 57 is selected. For signed 8 bit multiplications, input 2 is selected and for unsigned 8 bit multiplications, input 3 is selected to sign or zero-extend A0, respectively. Operand B0 may be the lower 8 bits of a 16 bit number or an 8 bit signed or unsigned number. If signed, bit 7 is the sign bit. The operand B0 is Booth encoded, typically using radix 4 Booth encoding. As indicated by 105, the eight bit B0 operand is sign extended by two bits for signed 8 bit multiplication and is zero-extended by two bits for unsigned 8 bit multiplications and 16 bit multiplications, and a trailing zero is added, before encoding. Booth encoding generates five partial products for the multiplication of A'×B0. As described above, these partial products are added using a 5:2 CSA tree. The 24 bit result is indicated at 107. For a 16 bit multiplication, the entire 24 bit result participates in the final result, whereas for 8 bit multiplications, the upper 8 bits will have zeros or sign extension bits. The lower 16 bits, 0–15 contain the product of A0 and B0. The upper 8 bits 16–23 will be either zeros in case of unsigned multiplication or the sign extension of the lower 16 bit result in case of signed multiplication, for 8 bit multiplications. For 16 bit multiplications it will contain actual data bits.

Figure 5:
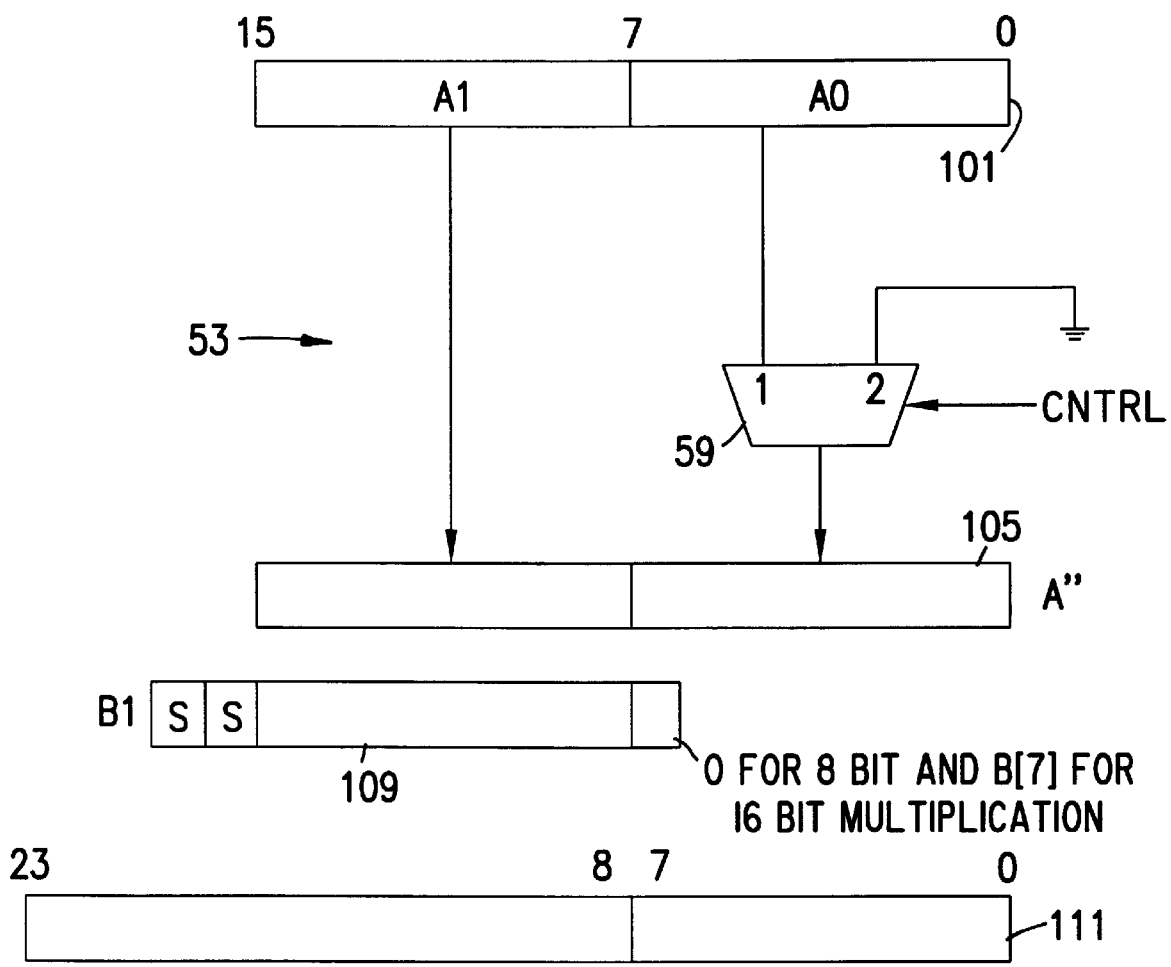
FIG. 5 is a similar representation of the other multiplier of FIG. 2.

Similarly, the multiplication of A×B1 of multiplier 53 is performed simultaneously as shown in FIG. 5. B1 is either the upper 8 bits of a 16 bit number or an 8 bit number. In either case if the number is signed, bit 15 is the sign bit. As indicated by 109, B1 is sign-extended by two bits for both signed 8 bit and 16 bit multiplications, and is zero extended for unsigned multiplications. A trailing 0 is added for 8 bit multiplications and a trailing bit equal to B[7] for a 16 bit multiplication before Booth encoding. In this case, a 2-1 multiplexer 59 selects from register 101 either A0, the 8 least significant bits of A, or zero as the eight least significant bits of the operand A" for 16 and 8 bit multiplies, respectively. The product, as indicated by 111, is 24 bits wide. Bits 8–23 are used for all multiplications. Bits 0–7 are used in 16 bit multiplications but are zero in 8 bit multiplications. For an 8 bit multiplication the result A"B1 will thus have eight least significant zeros, bits 0–7. It will have the result of A×B1 from bit 8 through bit 23.

Figure 6:
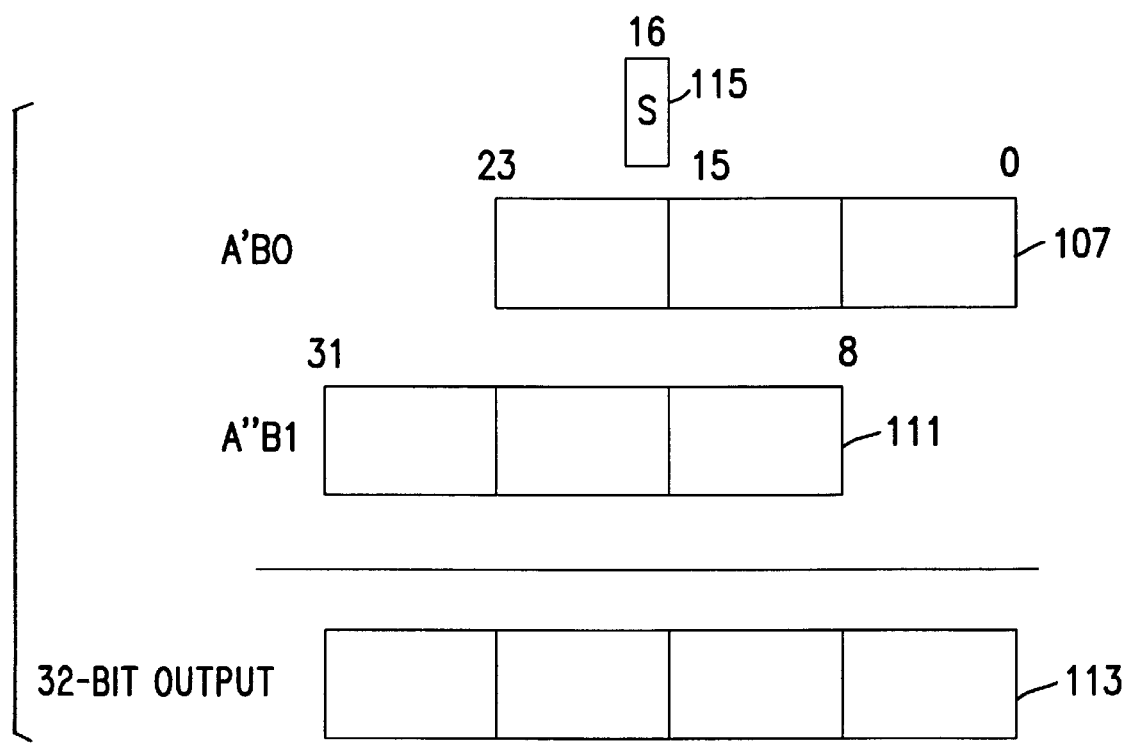
FIG. 6 illustrates schematically the addition of the products generated by the multipliers of FIGS. 4 and 5.

Thus, each of the products is 24 bits wide as shown in FIGS. 4 and 5. The weighted summation of these two products in block 55 of FIGS. 2 and 3 gives the 16×16 bit multiplication result. This summation is schematically illustrated in FIG. 6. The products are shown as A'B0 (107) and A"B1(111). A'B0 is sign extended to 32 bits before addition. These products are outputs of CSA trees as explained above in connection with FIGS. 2 and 3 and thus will be in redundant sum and carry form. For simplicity of illustration, each of them is shown as one vector in FIG. 6.

In addition to the sum and carry vectors, a sign-correction vector 115 is required for signed 8 bit multiplications, as discussed above. The sign-correction vector will be a zero for 16 bit multiplications and unsigned 8 bit multiplications. Thus there will be five vectors to be summed using CSAs 125 and 127 as illustrated in FIG. 3. The output of the CSA tree gives the sum and carry vectors which are added using a CPA adder 135 that gives a 32 bit result 113.

Sixteen bit multipliers simply sum the two results. Eight bit unsigned multipliers may also just sum the results because the high 8 bits of A'B0 and the low 8 bits of A"B1 are both 0, so there is no interference between the upper and lower 16 bits of the result. Unfortunately, 8 bit signed multipliers create a problem because the upper 8 bits of A'B0 contain the sign extension of the product, not zero. Since all these products are to be treated separately in packed multiplication, the sign-extension bits should not participate in the product summation. To nullify the effect of these bits, the sign correction vector is used. As illustrated in FIGS. 2, 3 and 6, this is done by adding correction vector 115, which will have a value of 1 in the case of signed 8 bit multipliers if the sign of the result is expected to be negative, to bit 16 of A'B0. This works on the principle that adding a one at the LSB of a series of ones will generate a series of zeros. Bits 31:23 are sign extended for signed 8 bit multiplications. The carry-out falls off the end (bit 31) and is ignored. The single correction bit in the sign correction vector 115 will be zero for 16 bit multiplications and also for unsigned 8 bit multiplication is the XOR of A0[7] and B0[7], i.e., the XOR of the signs of A0 and B0 for signed 8-bit multiplication.

Figure 7:
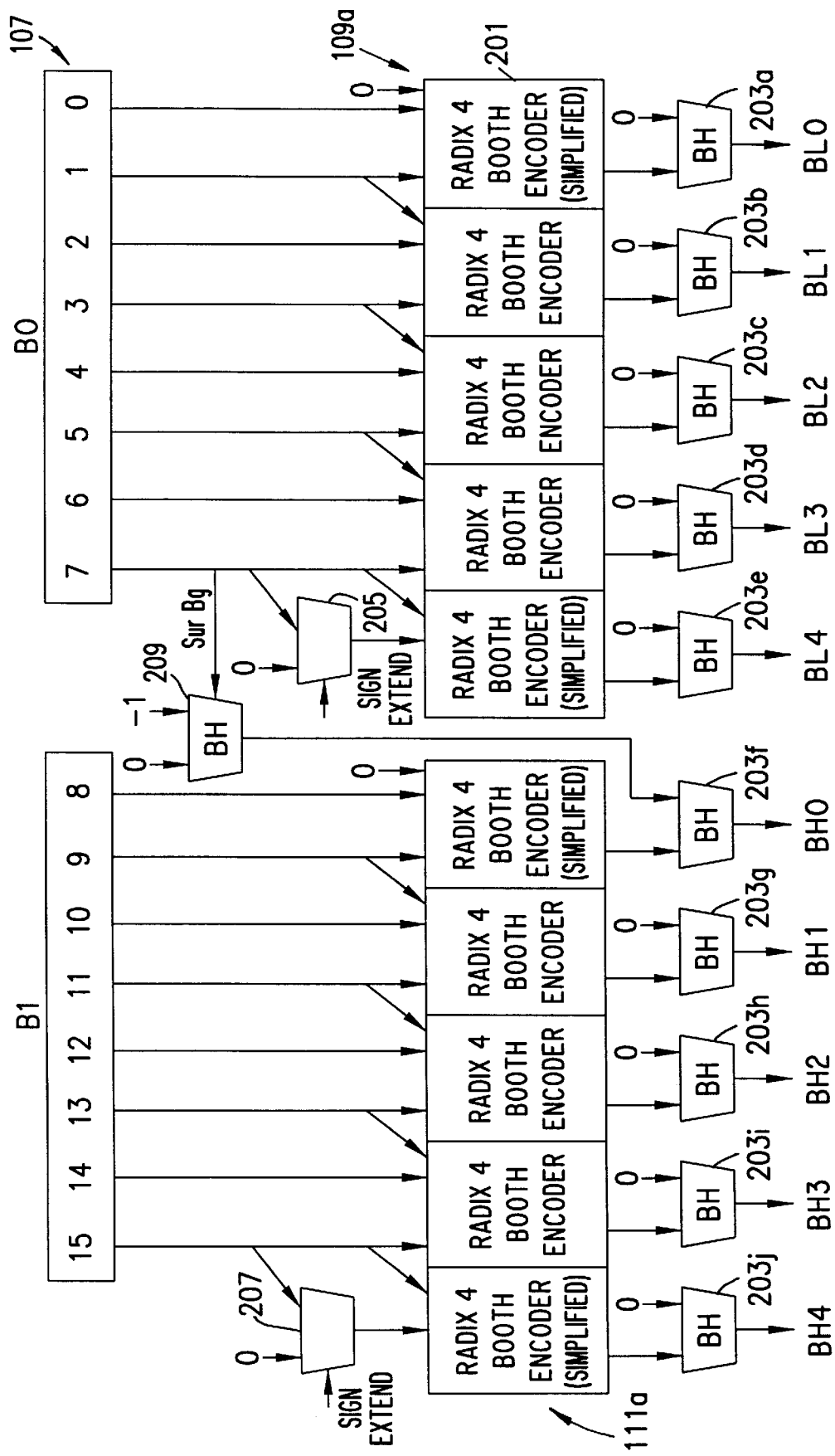
FIG. 7 is a diagram showing a radix 4 Booth encoder implementation.

FIG. 7 shows an implementation of the Booth encoding which reduces the loading on the sign bit. The illustrated structure works for all 8 bit multipliers. Inputs B0 and B1 from register 107 provide inputs to a series of Booth encoders 201, each having three inputs and an output (in conventional fashion a 1 out of 5 output). The Booth encoder outputs are inputs to multiplexers 203 a–j which provide outputs BL0–BL4 and BH0–BH4. These BH and BL terms (each comprising five signals) are the five Booth encoded terms for the high and low 16×8 multipliers 115 and 113 (A"×B1, A'×B0), respectively. All signed multiplies take the sign extension into the high order terms from the multiplexer on the previous bits. Unsigned multiplies take a 0 in the sign extension multiplier. That is, sign bit 7 of B0 is an input to multiplexer 205 which has 0 as a second input. For sign extended multiplies the sign bit input is selected. Similarly, multiplexer 207 has bit 15 of B1 as one input and 0 as a second input. For sign extended multiplies, bit 15 is selected. For 16 bit multiplies the circuit encodes the whole operand, both B1 and B0 from register 107. For an 8 bit multiply using only B0, the multiplexers 203 f–j override the regular Booth encoding from encoders 201 f–j to force 0s into the BH lines. If the sign bit, bit 7 of B0 is set, multiplexer 209 causes a 1 to be supplied to multiplexer 203f causing BH0 to be 1. For an 8 bit multiply using only B1, multiplexers 203 a–e override the Booth encoding of encoders 201 a–e to force 0s into the BL lines.

Figure 8:
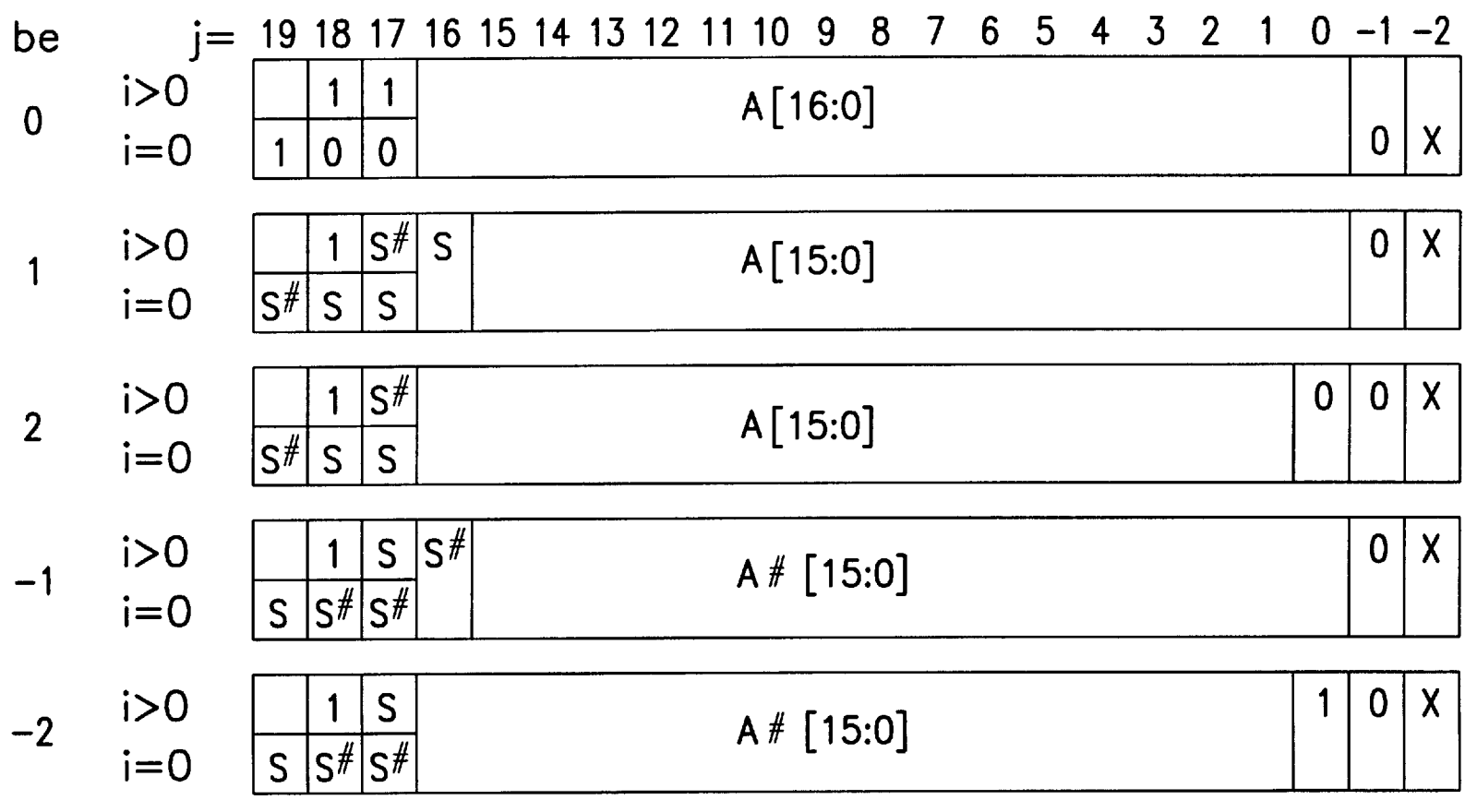

FIG. 8 illustrates the basis on which partial products are generated from the outputs of the Booth encoders and the operand A' or A" in partial product generators 113 and 115 of FIG. 6 (the "#" sign indicates negation). Implementation of such partial product generators is well known in the art. See, for example, the aforementioned published U.K. Application GB 2,262,638A. Illustrated is the partial product bit [2×i+j] of partial product [i] (i=0, 1, 2, 3, 4) for the indicated values of j. As noted, partial product 0 is different than partial products 1 . . . 4. Each Booth encoder 109 and 111 provides five output signals for generating five partial products. Each of the five outputs has five lines, only one of which is active at any time. These represent multiplying the A operand by 0,1,2,-1, and -2 respectively. The partial products indicated in FIG. 8 are all present in the partial product generator and a 5:1 multiplexer is used to select one of the five based on the respective outputs of the Booth encoder.

The middle portion of each partial product represents the 17 bit product: 0, A, 2A, -A or -2A respectively. To properly generate —A or —2A, a 1 must be added to the LSB after A or 2A is complemented (this can be called the negative correction bit). To do this efficiently, a 1 can simply be added to bit -2 of partial product [i+1]. Hence, the X bit of partial product [i] is set if be[i—1] is -1 or -2. The X bit of partial product [0] is always 0 because there is no previous partial product. A problem would arise if the most significant Booth Encoded term were −1 or −2 because there is no higher partial product on which to set the X bit, but as FIG. 8 implies, the most significant Booth Encoded term may only be 0 or 1.

The most significant bits reflect sign extension. Using a trick well-known in the art, three bits of sign extension are required for partial product [0]; two bits suffice for the other partial products. S is the sign bit, A[15] for signed multiplies or 0 for unsigned multiplies.

Figure 9:
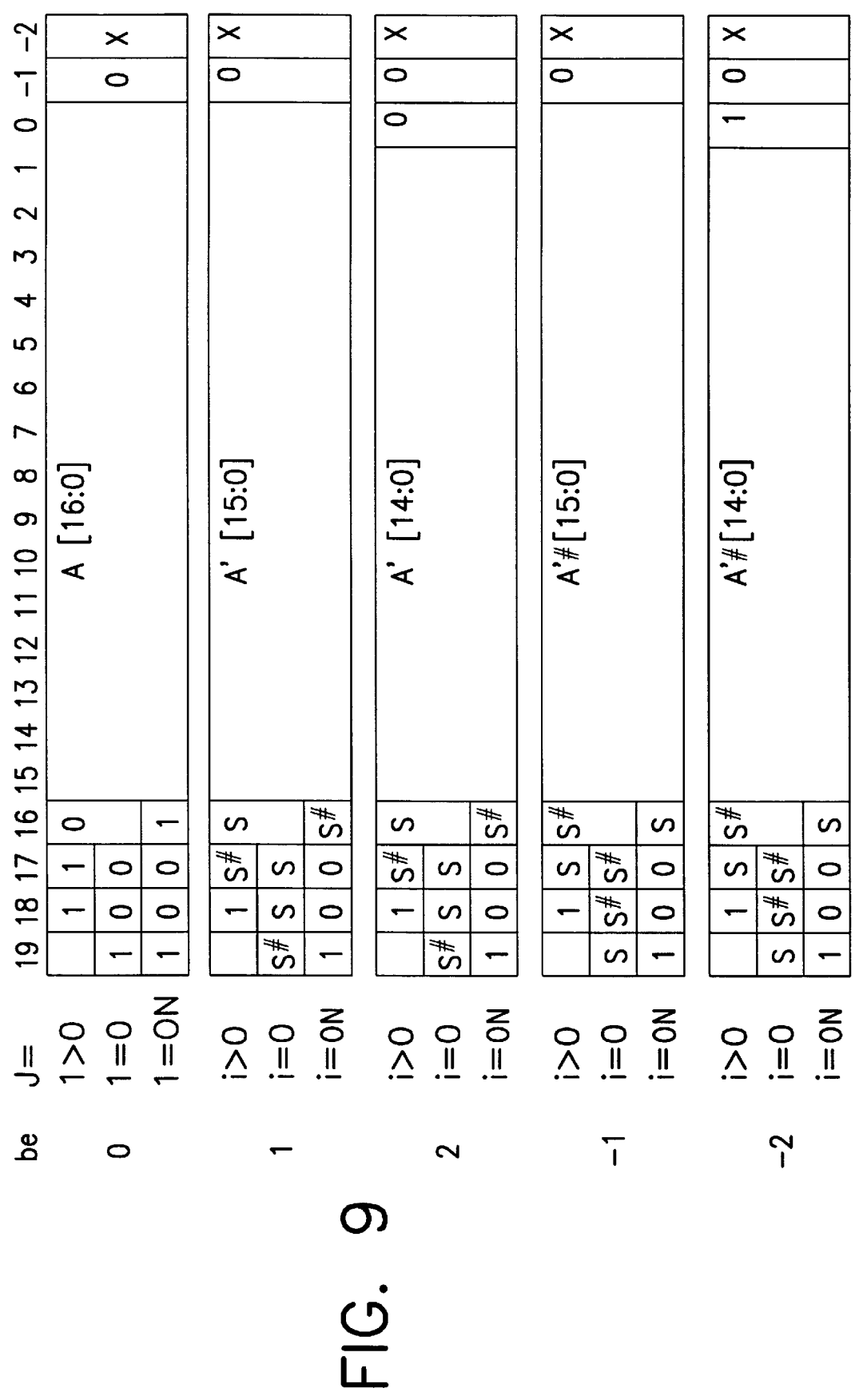

In FIG. 3 XOR gate 131 and multiplexer 133 are used to generate a correction vector which is a 1 for signed 8 bit multiplies when the sign is negative. This converts all of the 1's into 0's, solving the problem caused by the sign extension bits but adds a CSA delay to the critical path. This end can also be accomplished with no overhead in the critical path by adding one more case to the partial product generation for partial product [0] of the low 16×8 multiplier when the sign of A'B0 is negative (i.e. A[7] XOR B[7] for signed 8 bit multiplies). This is shown in FIG. 9. The sign extension bits differ for each partial product. For partial products [1 . . . 4] of the high and low 16×8 multipliers 115 and 113, the first choice of partial products is used (i>0). For partial product [0] of the high 16×8 multiplier 115, the i=0 choice is used. It is also used for the low multiplier 113 for unsigned operations or when the sign bit is 0 or for 16 bit multiplies. Finally, for partial product [0] of the low multiplier 113 on 8 bit signed multiplies with the sign bit set, the i=0N choice is used to compensate for the sign extension into the upper 8 bits of A'B0.

Figure 10:
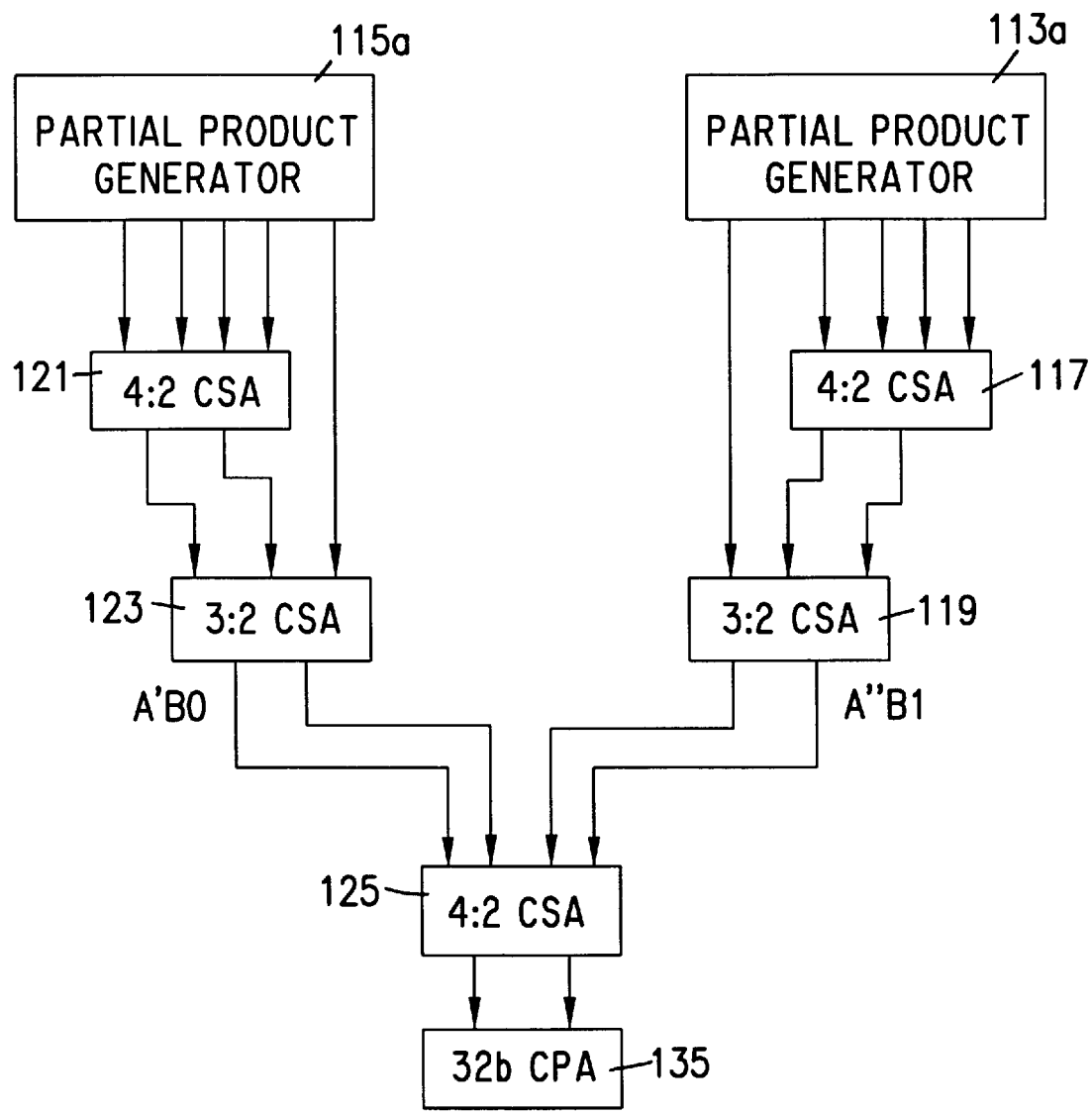
FIG. 10 shows the CSA tree which results from the Booth encoding illustrated in connection with FIG. 8.

FIG. 10 shows the new 10:2CSA tree used in the multiplier when the partial product generation of FIG. 9 is used. As in FIG. 6, A'B0 and A"B1 are computed by two 5:2 trees, i.e., one being made up of 4:2 CSA 121 and 3:2 CSA 133 and the other 4:2 CSA 117 and 3:2 CSA 119. Then the result is combined in 4:2 CSA 125.

As compared to FIG. 5, since this implementation of Booth encoding eliminates the correction vector 129, the output of CSA 125 can be coupled directly into CPA 135 eliminating CSA 127.

What is claimed is:

1. A method of multiplying operands of different bit lengths using a common combined array, where the largest operands to be multiplied have n bits, comprising:
   a. performing $2^{m-1}$ multiplications in $2^{m-1}$ multipliers, where m is equal to the number of different bit lengths it is desired to multiply, each multiplication being an $n \times n/2^{m-1}$ multiplication;
   b. adding the results of the multiplications together in at least one adder to obtain a 2 n bit result;
   c. in the case of signed operands, when doing the addition of the different multiplication results, adding a correction vector having a number of bits equal to m-1 using said at least one adder; and
   d. selecting and providing as an output groups of bits from said 2 n bit result depending on the length of the operands being multiplied.

2. The method of claim 1 and further including Booth encoding, in a Booth encoder, one operand in performing said multiplications.

3. The method according to claim 2 further comprising carrying out said multiplications by using said Booth encoded operands and the other operand involved in the multiplication to generate partial products and summing said partial products using an array of carry save adders and a carry propagate adder.

4. The method according to claim 2 and further including, in the case of signed operands, using the results of said Booth encoding in said $2^{m-1}$ multipliers to generate partial products in such a way as to correct for errors in the upper bits when the multiplication results for one or more of the lower $2^{m-1}$ multiplications gives a negative result.

5. Apparatus to do multiplications of pairs of operands of different binary lengths using a common combined array, where the largest operands to be multiplied have n bits comprising:
   a. $2^{m-1}$ multipliers, where m is equal to the number of different lengths it is desired to multiply, each multiplier being an $n \times n/2^{m-1}$ multiplier;
   b. an adder summing the outputs of said multipliers obtain a 2 n result;
   c. a correction vector input to said adder: and
   d. a multiplexer for selecting portions of said 2 n result.

6. Apparatus according to claim 5 wherein each of said multipliers comprises:
   a. a Booth encoder receiving $n/2^{m-1}$ bits of one operand and providing Booth encoded outputs;
   b. a converter for converting the other operand into a derivative thereof;
   c. a partial product generator receiving said Booth encoded outputs and said derivative as inputs and providing partial products as outputs; and
   d. an array of carry save adders receiving said partial products as inputs and providing outputs representing the product of the inputs to said partial product generators.

7. Apparatus according to claim 6 wherein said array summing the outputs of said partial product generators comprises:
   a. a carry save adder having the outputs of said partial product generators as inputs; and
   b. a carry propagate adder receiving the outputs of said carry save adders as inputs and providing the final multiplication result.

8. Apparatus according to claim 7 wherein said correction vector input is an input to said carry save adder.

9. Apparatus according to claim 8 wherein said partial product generators are such as to compensate for the effect of a sign bit at other than the highest bit position of the operand from which the bits being Booth encoded are taken.

10. A method of performing n×n bit and 2 n×2 n bit multiplications using two 2 n bit operands which may each represent one 2 n bit quantity or two n bit quantities in a way which permits using a common multiplier comprising:
   a. performing multiplications in two 2 n by n multipliers;
   b. when performing a 2 n by 2 n multiplication
      i. carrying out a 2 n by n multiplication in each of said multipliers with one 2 n operand being the same in each and the n input of one being the lower n bits of the other 2 n operand and the n input of the other being the upper n bits of the other 2 n operand;
      ii. adding the results of said two multiplications;
   c. when performing n by n multiplications:
      i. dividing one 2 n bit operand into an operand B0 comprising its lower bits and an operand B1 comprising its upper n bits;
      ii. forming a quantity A' of 2 n bits in which the lower n bits are the same as the lower n bits of the other 2 n bit operand and the upper n bits are extended bits;
      iii. multiplying said quantity A' by B0 to obtain the result A'B0;

iv. forming a 2 n bit quantity A" from said other 2 n bit operand having its upper n bits equal to the upper n bits of the other 2 n bit operand and its lower n bits 0;

v. multiplying A" by B1 to obtain the result A"B1;

vi. adding the results A'B0 and A"B1 to obtain a 4 n bit result;

d. in the case of signed operands, when adding the multiplication results, adding a correction vector to said results; and e. selecting bits of the 4 n bit result.

11. A method of carrying out 2 n×2 n bit and n×n bit multiplications in a combined array multiplier comprising two 2 n×n bit multipliers comprising:

a. forming an A operand of 2 n bits representing either one 2 n bit quantity or two n bit quantities;

b. converting said A operand to a 2 n bit derivative operand designated A' which includes as its bits 0 to n-1, the bits 0 to n-1 of the quantity A;

c. selecting as the bits n to 2n-1 of said operand A':
   i. for a 2 n×2 n bit multiplication, bits n through 2n-1 of the A operand;
   ii. for a signed n×n bit multiplication, bit n-1 of the A input operand
   iii. for an unsigned n×n multiplication, 0;

d. forming a B operand of 2 n bits representing either one 2 n bit quantity or two n bit quantities;

e. dividing said B operand into B0 and B1, B0 comprising bits 0 to n-1 of B and B1 comprising bits n to 2n-1 of B;

f. converting said A operand to a 2 n bit derivative operand designated A" which includes as its bits n to 2n-1, the bits n to 2n-1 of the quantity A;

g. selecting as the bits n to 2n-1 of said operand A":
   i. for a 2 n×2 n bit multiplication, bits 0 through n-1 of the A operand;
   ii. for n×n multiplications, 0;

h. Booth encoding B0;

i. using the result of said Booth encoding along with the operand A' to generate partial products for the multiplication of A'×B0;

j. adding the partial products using a carry save adder to obtain the result A'×B0;

k. Booth encoding B1;

l. using the result of said Booth encoding along with the operand A" to generate partial products for the multiplication of A"×B1;

m. adding the partial products using a carry save adder to obtain the result A"×B1; and n. calculating the weighted sum of A'×B0 and A"×B1 in an array including a carry save adder and a carry propagate adder;

o. in the case of signed operands, adding a correction vector to said weighted sum using an adder in said array; and p. selecting from said weighted sum groups of bits which are representative of the quantities being multiplied.

12. Apparatus for carrying out a 2 n×2 n bit and n×n bit multiplications in a combined array multiplier comprising:

a. a first multiplexer having a first 2 n bit operand A, which may represent one 2 n bit quantity or two n bit quantities, as inputs and providing outputs by selecting as the bits n to 2n-1 of an operand A', where A' is a first modified form of said first 2 n bit operand A that may represent one 2 n bit quantity or 2 n bit quantities and bits 0 to n-1 of said first 2 n bit operand A are equal to bits 0 to n-1 of said operand A':
   i. for a 2 n×2 n bit multiplication, bits n through 2n-1 of the A operand;
   ii. for a signed n×n bit multiplication, bit n-1 of the A input operand;
   iii. for an unsigned n×n multiplication, 0;

b. a second multiplexer having said first 2 n bit operand A as inputs and providing outputs by selecting as the bits 0 to n-1 of an operand A", where A" is a second modified form of said first 2 n bit operand A that may represent one 2 n bit quantity or 2 n bit quantities and bits n to 2n-1 of said first 2 n bit operand A are equal to bits n to 2n-1 of said operand A":
   i. for a 2 n×2 n bit multiplication, bits 0 through n-1 of the A operand;
   ii. for n×n multiplications, 0;

c. a first Booth encoder having B0 as an input and providing a first Booth encoded output, where B0 includes bits 0 to n-1 of B and B is a second 2 n bit operand which may represent one 2 n bit quantity or 2 n bit quantities;

d. a second Booth encoder having B1 as an input and providing a second Booth encoded output, where B1 includes bits n to 2n-1 of B;

e. a first partial product generator having said first Booth encoded output and said operand A' as inputs and providing first partial products for the multiplication of A'×B0 as outputs;

f. a carry save adder having as inputs said first partial products and providing as outputs the result A'×B0;

g. a second partial product generator having said first second Booth encoded output and the operand A" as inputs and providing second partial products for the multiplication of A"×B1 as outputs;

h. a carry save adder having as inputs said second partial products and providing as outputs the result A"×B1;

i. an array including a carry save adder and a carry propagate adder having as inputs said results A'×B0 and A"×B1 calculating the weighted sum of A'×B0 and A"×B1;

j. a correction vector input to said array; and k. a multiplexer selecting from said weighted sum in said carry propagate adder groups of bits which are representative of the quantities being multiplied.

13. Apparatus according to claim 12 wherein said correction vector input comprises:

a. an exclusive OR gate having as inputs bits n-1 of said first and second operands; and b. a multiplexer having as inputs the output of said exclusive OR gate and ground and selecting said OR gate input as an output when doing a signed n bit multiplication using bits 0 to n-1 and said ground input as an output at all other times.

14. Apparatus according to claim 12 wherein said first and second partial product generators are such as to compensate for the effect of a sign bit at other than the highest bit position of the operand from which the bits being Booth encoded are taken.

15. Apparatus according to claim 12 wherein each of said first and second Booth encoders include:

a. a plurality of n/2+1 encoder elements receiving bits of the operand B as inputs, said inputs being zero extended and sign extended and providing an output; and b. a plurality of multiplexers, each having as inputs a respective encoder element output and 0 and selecting 0 if the n bits encoded are not being multiplied.

16. Apparatus according to claim 12 and further including:

a. a sign bit multiplexer having as inputs 1 and 0 and controlled by the sign of B0, and wherein;

b. the second input of the one of said plurality of multiplexers of the second Booth encoder in the lowest order position coupled to the output of said sign bit multiplexer.

\* \* \* \* \*